April 11, 1967

H. A. JACKSON 3,313,365

TWO-WHEELED MOTOR VEHICLE

Filed May 7, 1965

INVENTOR.
HAROLD A. JACKSON
BY
ATTORNEY

April 11, 1967            H. A. JACKSON            3,313,365
TWO-WHEELED MOTOR VEHICLE
Filed May 7, 1965            2 Sheets-Sheet 2
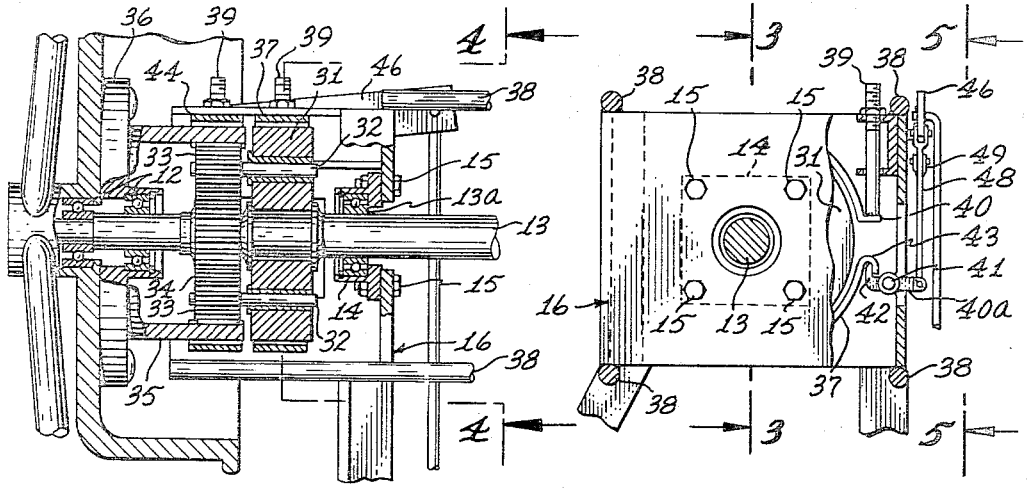
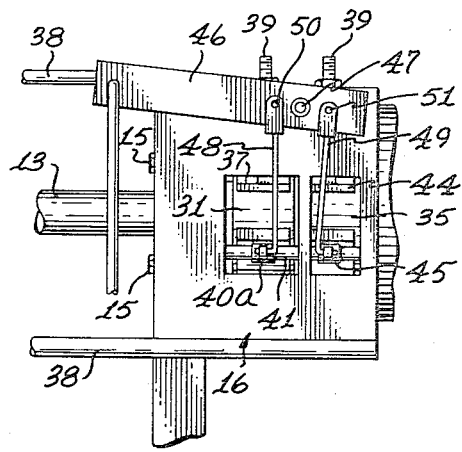
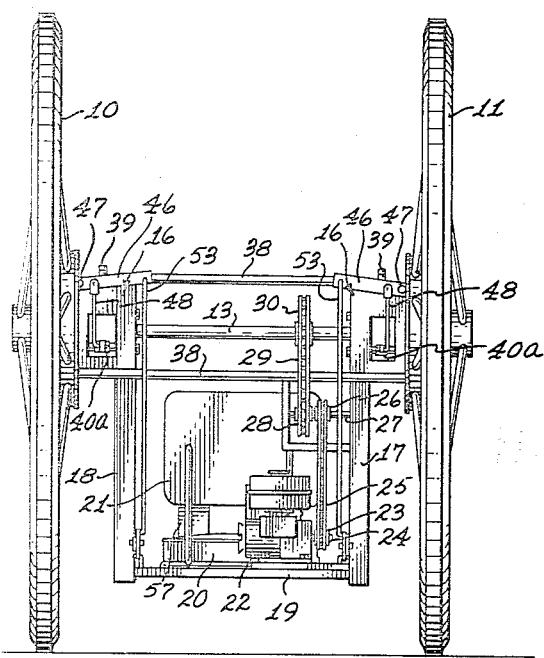
INVENTOR.
HAROLD A. JACKSON
BY
Willard S. Grover
ATTORNEY 3,313,365
TWO-WHEELED MOTOR VEHICLE
Harold A. Jackson, Box 7, Soldatna,
Kenai, Alaska 99669
Filed May 7, 1965, Ser. No. 454,032
4 Claims. (Cl. 180—6.2)

This invention pertains to motor vehicles and is particularly directed to a two-wheeled vehicle.

One of the objects of this invention is to provide a two-wheeled vehicle in which the two wheels are at all times geared positively together except during a turn so as to greatly enhance safety and maneuverability of the vehicle.

Still another object of this invention is to provide a two-wheeled vehicle structure in which the rotation of the driving axle is opposite to the wheel rotation so as to automatically counteract the tendency of the carriage or body in which the operator rides, to roll or swing back and forth so as to create much greater stability for the two-wheeled vehicle.

Still another object of this invention is to provide in a two-wheeled vehicle a single lever control which operates the driving clutch and brake depending upon the direction in which the control lever is moved so as to control the steering and stopping and starting of the vehicle with ease and safety of control.

Still another object of this invention is to provide a two-wheeled vehicle having a gear ratio such that no clutch on the main driving engine is required and such that release of the control levers automatically bring the vehicle to a stop independently of motor control.

Further features and advantages of this invention will appear from a detailed description of the drawings in which:

FIG. 3 is an enlarged fragmentary sectional view on the line 3—3 of FIG. 4.

FIG. 4 is an enlarged fragmentary view, partly in section on the line 4—4 shown in FIG. 3

FIG. 5 is an enlarged fragmentary view indicated by the line 5—5 of FIG. 4.

FIG. 6 is a rear elevation of the vehicle shown in FIGS. 1 and 2.

Figure 1:
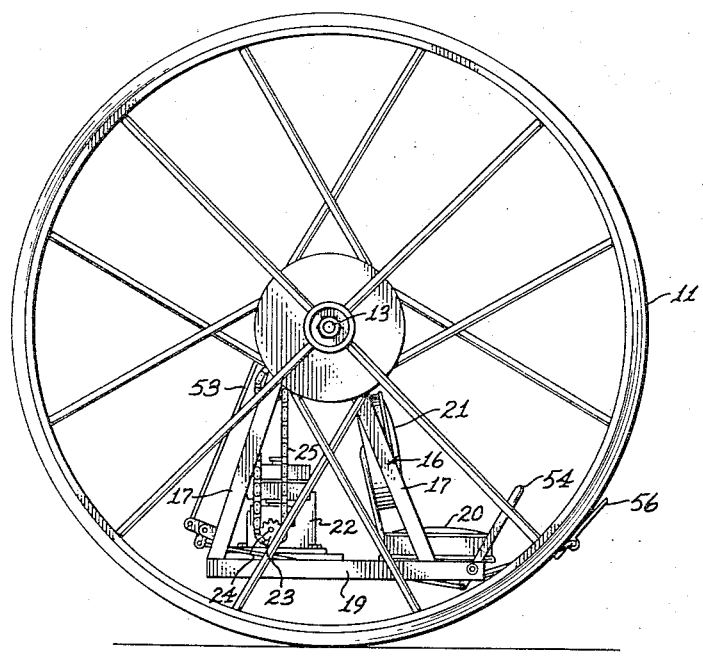
FIG. 1 is a side elevation of the two-wheeled motor vehicle incorporating the features of this invention.
Figure 2:
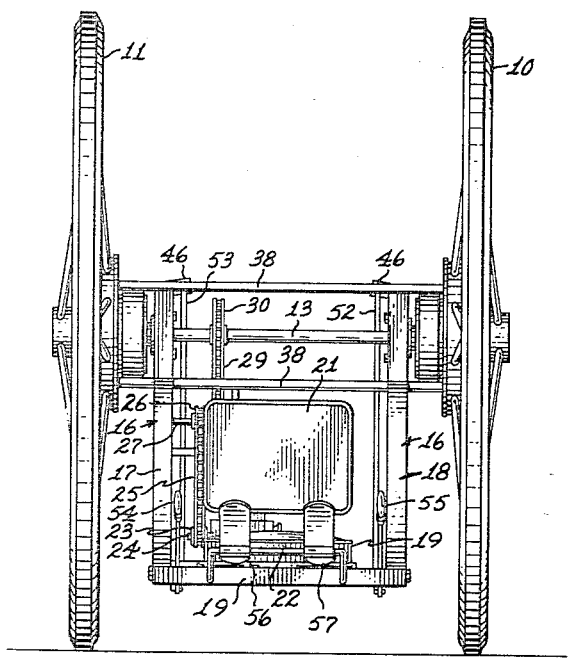
FIG. 2 is a front elevation of the vehicle shown in FIG. 1.

As an example of one embodiment of this invention, there is shown a two-wheeled motor vehicle comprising a pair of axially spaced road wheels 10 and 11 each freely journaled against axial movement on suitable bearings 12 on the outer ends of the axle 13. Suspended pendulum fashion on suitable bearings 13a in bearing boxes 14 by bolts 15 is the operator chassis on frame 16 comprising the divergent side suspension members 17 and 18 to the lower ends of which is fixed the floor 19 upon which is mounted the operator's seat 20 having the back 21 and behind which is located the main drive motor 22. The main drive motor 22 has a drive sprocket 23 fixed to its output shaft 24 over which operates a drive chain 25 in turn operating over a small intermediate sprocket 26 journaled on the intermediate shaft 27 fixed to the operator frame 16. A larger intermediate sprocket 28 is journaled on the intermediate shaft, and connected in driven relationship with the intermediate sprocket 26, over which operates the second drive chain 29 which engages over and drives a suitable large sprocket 30 fixed to the axle 13 so that the engine 22 is at all times directly coupled to the axle 13 at the desired speed ratio for proper operation of the vehicle.

On the outer ends of the axle 13 are journaled the planet carrier and drive drums 31, FIG. 3, having pins 32 upon which are journaled the planet gears 33 which are in mesh with the sun gears 34 fixed to the ends of the axle 13. The planet gears 33 also engage the ring gears 35 which are fixed to the hub portions 36 of the wheels 10 and 11. Brake bands 37 are carried on the cross members 38 formed integral with the frame 16 by the adjustable carrier bolts 39 attached to one end 40 of the brake band 37 while the other end of the brake band 37 is actuated by the operating lever 40a pivotally mounted on a pin 41 carried in the frame 16 and having a turned over end 42 engaging the other end 43 of the brake band 37 so that operation of the lever 40a actuates the brake band 37 so as to lock or release rotation of the planet carrier and drive drum 31 relative to the frame 16. In a similar manner brake bands 44 carried on the frame 16 are adapted to be operated by operating levers 45 to lock or release rotation of each of the road wheels 10 relative to the frame 16.

The pair of brake bands 37 and 44 at each end of the axle 13 are arranged to be alternately engaged and disengaged by a rocking lever arm 46 pivotally mounted on a pin 47 carried on the frame 16 to which are connected the operating rods 48 and 49. Rod 48 is pivotally connected at 50 to the lever arm 47 and to the outer end of the operating lever 40a while the rod 49 is pivotally connected at point 51, diametrically oppositely positioned relatively to the pivot pin 47 from the pivot point 50, with the other end of the rod 49 pivotally connected to the outer end of the operating lever 45.

Each of the rocking lever arms 46 have their outer ends pivotally connected to downwardly extending rods 52 and 53 which in turn are connected to suitable control handles 54 and 55 or foot treadles 56 and 57 mounted on the floor 19 of the frame 16 in convenient operative position for the user of the vehicle.

Because of the utilization of the planetary gearing 33–34–35 the rotation of the road wheels 10 and 11 is opposite from the driven rotation of the driving axle 13 so as to counteract the tendency of the frame 16 to rock and swing during the operation of the vehicle. The control handle and foot treadles alternately apply and release the power bands 37 and the brake bands 44 depending upon which way each is moved so that to travel straight ahead both levers are pulled the same direction to clamp bands 37. To make a turn, one band 37 is released and then a little further movement applies the brake band 44 to make a short turn. The axle 13 is being constantly driven without any intervening clutch from the motor 22 whenever it is operating and no power is transmitted to the wheels 10 and 11 until a band 37 is applied so that upon release of the levers 54 or 55 or foot treadles 56 and 57 power is disconnected and comes to a stop.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendant claims are intended to be included herein.

Having thus fully set forth and described this invention, what is claimed and desire to be obtained by United States Letters Patent is:

1. A road vehicle comprising a combination:
   (A) a pair of axially spaced road wheels,
   (B) an axle extending between said wheels and journaled at each end in said wheels,
   (C) a frame journaled on said axle between said wheels and suspended in pendulum fashion thereon,
   (D) a drive motor on said frame,
   (E) a positive drive transmission between said drive motor and said axle,
   (F) an operator's seat on said frame, (G) means on said frame for releasably clamping each of said wheels against rotation to said frame,
(H) a reduction drive transmission supported by said frame connected to each of said wheels,
(I) and means on said frame for releasably connecting said axle through said transmissions to drive said wheels from said axle.

2. A road vehicle comprising a combination:
(A) a pair of axially spaced road wheels,
(B) an axle extending between said wheels and journaled at each end in said wheels,
(C) a frame journaled on said axle between said wheels and suspended in pendulum fashion thereon,
(D) a drive motor on said frame,
(E) a positive drive transmission between said drive motor and said axle,
(F) an operator's seat on said frame,
(G) means on said frame for releasably clamping each of said wheels against rotation to said frame,
(H) a planetary speed reduction transmission between each of said wheels and said axle each consisting of,
(I) a sun gear fixed to said axle,
(J) a ring gear fixed to each wheel,
(K) a plurality of planet gears interconnecting said sun and ring gears,
(L) a planet gear carrier and drive drums journaled on said axle,
(M) and means on said frame for releasably locking said planet gear carrier and drive drums against movement relative to said frame.

3. A road vehicle comprising in combination:
(A) a pair of axially spaced road wheels,
(B) an axle extending between said wheels and journaled at each end in said wheels,
(C) a frame journaled on said axle between said wheels and suspended in pendulum fashion thereon,
(D) a drive motor on said frame,
(E) a positive drive transmission between said drive motor and said axle,
(F) an operator's seat on said frame,
(G) means on said frame for releasably clamping each of said wheels against rotation to said frame,
(H) a planetary speed reduction transmission between each of said wheels and said axle each consisting of,
(I) a sun gear fixed to said axle,
(J) a ring gear fixed to each wheel,
(K) a plurality of planet gears interconnecting said sun and ring gears,
(L) a planet gear carrier and drive drums journaled on said axle,
(M) means on said frame for releasably locking said planet gear carrier and drive drums against movement relative to said frame,
(N) and means on said frame actuable from said operator's seat for alternately and selectively engaging said means for clamping each of said wheels and said planet gear carriers against rotation relative to said frame.

4. A road vehicle comprising in combination:
(A) a pair of axially spaced road wheels,
(B) an axle extending between said wheels and journaled at each end in said wheels,
(C) a frame journaled on said axle between said wheels and suspended in pendulum fashion thereon,
(D) a drive motor on said frame,
(E) a positive drive transmission between said drive motor and said axle,
(F) an operator's seat on said frame,
(G) means on said frame for releasably clamping each of said wheels against rotation to said frame,
(H) a reduction drive transmission connected between said axle and each wheel to cause said wheels to be driven in the opposite direction from the rotation of said axle by said drive motor,
(I) and means on said frame for releasably connecting said axle through said transmissions to drive said wheels from said axle.

References Cited by the Examiner
UNITED STATES PATENTS

| | | | |
|---|---|---|---|
| 353,935 | 12/1886 | Gibbons et al. | 280—208 |
| 601,107 | 3/1898 | Simpier | 208—208 |
| 1,193,560 | 8/1916 | Kerlin | 180—10 |
| 1,224,109 | 3/1917 | Sand | 74—789 |
| 1,238,702 | 8/1917 | Welch | 180—21 |
| 2,549,182 | 3/1951 | Ekenstam | 180—10 |

KENNETH H. BETTS, *Primary Examiner.*